United States Patent Office 3,790,557
Patented Feb. 5, 1974

3,790,557
THIADIAZOLYL-AZO-PHENYL OR -TETRA-
HYDROQUINOLINE COMPOUNDS
Max A. Weaver and James M. Straley, Kingsport, Tenn., assignors to Eastman Kodak Company, Rochester, N.Y.
No Drawing. Filed Jan. 19, 1972, Ser. No. 219,152
Int. Cl. C09b 29/36
U.S. Cl. 260—158
10 Claims

ABSTRACT OF THE DISCLOSURE

Monoazo compounds consisting of a diazo component having the formula

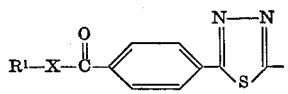

in which X is oxygen, imino or alkylimino and $R^1$ is hydrogen, alkyl, cycloalkyl or aryl, and an aniline or 1,2,3,4-tetrahydroquinoline disperse azo dye coupling component produce bright red to bluish-red shades on polyester fibers and exhibit good fastness to light and resistance to sublimation.

---

This invention relates to certain novel azo compounds and, more particularly, to thiazolylazo compounds useful for dyeing polyester fibers such as yarns, filaments, fabrics and carpets.

Our novel compounds have the formula (I)

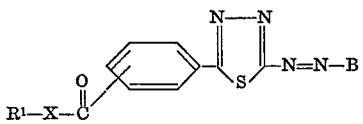

wherein $R^1$ is hydrogen; lower alkyl; lower alkyl substituted with hydroxy, lower alkoxy, lower alkanoyloxy, or aryl; cyclohexyl; lower alkylcyclohexyl; or aryl;

X is —O— or —$NR^2$— in which $R^2$ is hydrogen or lower alkyl; and

B is an aniline or 1,2,3,4-tetrahyroquinoline disperse azo dye coupling component.

The novel azo compounds of the invention produce bright, red to bluish-red shades on polyester fibers when applied thereto by conventional disperse dyeing techniques. Our compounds exihibit improved fasteness properties, including fastness to light and/or resistance to sublimation, when compared to known thiadiazolylazo compounds such as those disclosed in U.S. Pat. No. 3,096,320 and British Pat. No. 1,076,049.

The groups represented by $R^1$, $R^2$, X and B are well known in the art and can be derived from commercially-available or readily-obtainable intermediates. As used herein to describe an alkyl moiety, "lower" designates a carbon content of form one to about four carbon atoms. The constitution of the aryl group and the aryl moiety of the aralkyl group represented by $R^1$ generally is not important. However, for primarily economic reasons, such aryl groups are monocyclic aryl such as phenyl and phenyl substituted with lower alkyl, lower alkoxy or halogen.

The coupling components represented by B are well-known residues derived from well-known anilines and tetrahydroquinolines. Disperse dye coupling components are characterized by the absence therefrom of substituents which impart water-solubility to the dye compound. Accordingly, our novel compounds are essentially water insoluble due to the absence of water-solubilizing groups, such as sulfo, carboxyl and salts thereof, on the coupling component.

Illustrative of such coupling components are the groups having the formula

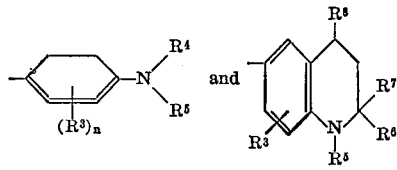

wherein $R^3$ is hydrogen, lower alkyl, lower alkoxy, lower alkylthio, aryloxy, arylthio or a carboxylic or sulfonic acylamido group; $n$ is 1 or 2; $R^4$ individually is hydrogen, alkyl, substituted alkyl, cycloalkyl, or aryl; $R^5$ individually is alkyl or substituted alkyl; $R^4$ and $R^5$ in combination with the nitrogen atom to which each is attached on the aniline coupling component, forms the remainder of a heterocyclic ring such as a piperidine morpholine or thiomorpholine-1,1-dioxide ring; and $R^6$, $R^7$ and $R^8$ each is hydrogen or lower alkyl.

Methyl, ethyl, propyl, isopropyl, butyl, isobutyl, methoxy, ethoxy, butoxy, ethylthio, phenoxy, and phenylthio are typical alkyl, alkoxy, alkylthio, aryloxy and arylthio groups which can be present on the above couplers. The acylamido group which $R^3$ can represent can be represented by the formula —NH—A in which A is the residue of the many known substituted or unsubstituted, alkyl-, cycloalkyl- and aryl-carboxylic acids or their anhydrides or acid chlorides, substituted and unsubstituted haloformate esters, and substituted and unsubstituted alkyl and aryl sulfonic acids. Formyl, lower alkanoyl, arolyl, cyclohexoyl, lower alkoxycarbonyl, lower alkylsulfonyl, cyclohexylsulfonyl, arylsulfonyl, carbamoyl, lower alkylcarbamoyl, arylcarbamoyl, and furoyl are examples of the acyl groups represented by A. The alkanoyl groups can contain substituents such as hydroxy, lower alkoxy, lower alkanoyloxyl, aryl, cyano, halogen, carbamoyl, aryloxy, etc. The alkylsulfonyl and alkoxycarbonyl groups also can be substituted, for example, with cyano, hydroxy, lower alkoxy, halogen, succinimido, pyrrolidinono and the like. Acetyl, propionyl, butyryl, cyanoacetyl, chloroacetyl, trifluoroacetyl, phenylacetyl, methoxyacetyl, methoxthioacetyl, methylsulfonylacetyl, methoxycarbonyl, propoxycarbonyl, butoxycarbonyl, methylsulfonyl, ethylsulfonyl, propylsulfonyl, butylsulfonyl, 2-cyanoethylsulfonyl, 2-hydroxyethylsulfonyl and 2-bromoethylsulfonyl are examples of the alkanoyl, alkoxycarbonyl and alkylsulfonyl groups which A can represent. The aryl group, designated Ar, of the arylalkanoyl, aroyl, arylsulfonyl and arylcarbamoyl groups preferably is monocyclic, carbocyclic aryl such as phenyl and phenyl substituted with lower alkyl, lower alkoxy or halogen. Tolyl, anisyl, p-bromophenyl and o,p-dichlorophenyl are typical of such aryl groups. Lower alkanoyl, lower alkoxycarbonyl and aroyl are preferred acyl group represented by A. When $(R^3)_n$ represents two substituents, they preferably are para to one another.

The alkyl groups represented by $R^4$ and $R^5$ can be unsubstituted or substituted, straight- or branch-chain alkyl of up to about eight carbon atoms. Methyl, ethyl, propyl, butyl, isobutyl, hexyl and 2-ethylhexyl are examples of the unsubstituted alkyl groups. The substituted alkyl radicals can contain a wide variety of 1, 2 or more substituents. For example, substituents conforming to the formula

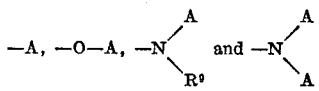

wherein A is defined above and $R^9$ is hydrogen, lower alkyl, substituted lower alkyl, cyclohexyl or aryl, can be present on alkyl radicals $R^4$ and $R^5$. The dicarboximido, pyrrolidinono, piperidono and phthalimidino radicals disclosed in U.S. Pats. 3,148,178, 3,342,799 and 3,386,987 and the groups having the formula

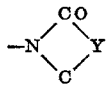

disclosed in U.S. Pat. 3,349,076 are further examples of substituents which can be present on alkyl radicals $R^4$ and $R^5$. Examples of other substituents include hydroxy, lower alkoxy, lower alkanoyloxy, cyano, lower cyanoalkoxy, aryl, aryloxy and groups having the formula

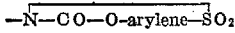

Cyclohexyl and lower alkylcyclohexyl are typical of the cycloalkyl groups which $R^2$ can represent.

Examples of the lower alkyl groups represented by $R^6$, $R^7$ and $R^8$ are set forth above. Preferably, $R^6$ is lower alkyl and $R^7$ and $R^8$ each is hydrogen or methyl, $R^6$ being methyl when $R^7$ and $R^8$ each is methyl.

The coupling components described above are typical of the vast number of aniline and tetrahydroquinoline disperse azo dye coupling components which are known in the literature. Additional examples of such coupling components and precursors thereof are described in the many patents issued throughout the world on disperse azo dyes during the last thirty years.

Preferred thiadiazolyl diazo components have the formula

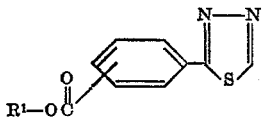

wherein $R^1$ is lower alkyl or lower alkyl substituted with hydroxy, lower alkoxy or lower alkanoyloxy.

Preferred coupling components have the formulas

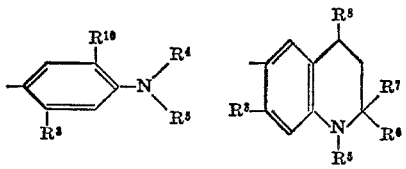

wherein $R^3$ is hydrogen, lower alkyl, lower alkoxy, lower alkanoylamino, lower alkoxycarbonylamino, or benzamido;

$R^{10}$ is hydrogen, lower alkoxy or, when $R^4$ is hydrogen, lower alkyl;

$R^4$ is hydrogen; lower alkyl; lower alkyl substituted with cyano, lower alkanoyloxy, lower alkoxycarbonyl, lower alkoxycarbonyloxy, lower alkoxy, cyclohexyl, or phenyl; or cyclohexyl;

$R^5$ is lower alkyl; lower alkyl substituted with succinimido, glutarimido, phthalimido, lower alkanoyloxy, lower alkoxycarbonyl, lower alkoxycarbonyloxy, or lower alkoxy;

$R^6$ is lower alkyl, or, when $R^7$ and $R^8$ each is methyl, $R^6$ is methyl; and $R^7$ and $R^8$ each is hydrogen or methyl.

The novel azo compounds of our invention which, because of their excellent cost:performance ratio, are especially valuable for dyeing polyester fibers conform to the formula

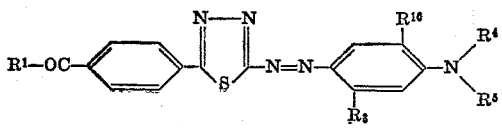

wherein $R^1$ is lower alkyl;

$R^3$ is methyl, lower alkanoylamino or lower alkoxycarbonylamino;

$R^{10}$ is hydrogen, or, when $R^4$ is hydrogen, methyl;

$R^4$ is hydrogen, lower alkyl, benzyl, cyclohexyl or the group $(-CH_2-)_nR^{11}$ in which $n$ is 2 or 3 and $R^{11}$ is lower alkanoyloxy, lower alkoxycarbonyl or cyano; and $R^5$ is lower alkyl, benzyl or the group $(-CH_2-)_nR^{11}$ in which $n$ is 2 or 3 and $R^{11}$ is lower alkanoyloxy, lower alkoxycarbonyl, succinimido, glutarimido, or phthalimido.

The novel compounds of the invention are prepared by diazotizing the appropriately substituted 2-amino-1,3,4-thiadiazole and coupling the resulting diazonium salt with an aniline of tetrahydroquinoline coupler according to conventional procedures. The 2-amino-1,3,4-thiadiazoles can be obtained by the following reaction sequence:

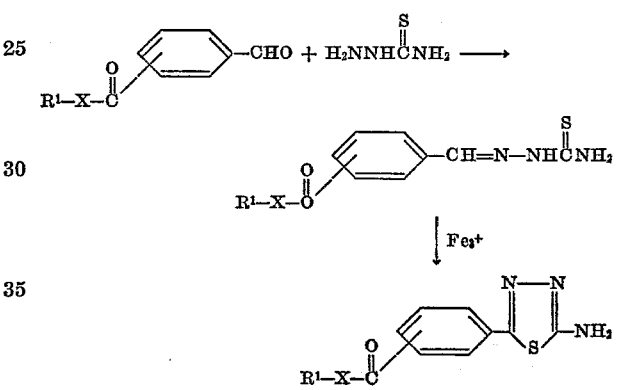

The couplers used are known compounds or can be obtained by procedures disclosed in the literature.

The novel compounds and their preparation are further illustrated by the following examples.

EXAMPLE 1

Thiosemicarbazide (18.2 g., 0.2 m.) is dissolved in 200 ml. of water at 70° C. To this is added a solution of methyl terephthaldehydate (0.2 m.) dissolved in 150 ml. of ethanol. The thiosemicarbazone precipitates immediately. To this suspension is added $FeCl_3 \cdot 6H_2O$ (108 g., 0.4 m.) dissolved in 200 ml. of water. The reaction mixture is stirred for 30 min. at 80–90° C. and then cooled. The hydrochloride salt is collected by filtration and then dissolved in 300 ml. of pyridine. The free amine product, 2 - amino-5-(p-methoxycarbonylphenyl)-1,3,4-thiadiazole, is precipitated by the addition of ice and water, collected by filtration, and recrystallized from 2-methoxyethanol. The M.P. of the product is 239–241° C.

Analysis.—Calcd. for $C_{10}H_9N_3O_2S$ (percent): C, 5.10; H, 3.9; N, 17.9; S, 13.6. Found (percent): C, 57.1; H, 3.9; N, 18.0; S, 13.8.

EXAMPLES 2–11

To 25 ml. of conc. $H_2SO_4$ is added portionwise $NaNO_2$ (3.6 g.). To this solution is added at less than 15° C. 50 ml. of 1:5 acid (1 part propionic:5 parts acetic acid). Then at 0–5° C. is added 2-amino-5-[p-methoxycarbonyl)phenyl]-1,3,4-thiadiazole (11.7 g., 0.5 m.), followed by an additional 50 ml. 1:5 acid. The diazotization reaction is stirred at 0–5° C. for 2–4 hr. An aliquot (.005 m.) of this solution is added to a chilled solution of .05 m. of each of the following couplers which is dissolved in about 25 ml. of 15% $H_2SO_4$ or 25 ml. of 1:5 acid:

N,N-bis-β-acetoxyethyl-n-toluidine (Example 2)
N-β-acetoxyethyl-N-ethylaniline (Example 3)
N-β-benzoyloxyethyl-N-ethyl-n-toluidine (Example 4)
N,N-diethyl-n-acetamidoaniline (Example 5)
N,N-bis-β-acetoxyethyl-m-acetamidoaniline (Example 6)
N-benzyl-N-ethyl-m-acetamidoaniline (Example 7)
N-cyclohexyl-2-methyl-5-acetamidoaniline (Example 8)
N-sec-butyl-2-methyl-5-acetamidoaniline (Example 9)
N-β-benzoyloxyethyl-N-ethyl-m-acetamidoaniline Example 10)
N-β-acetoxyethyl-N-ethyl-m-toluidine (Example 11)

The coupling solutions are buffered by the addition of ammonium acetate and allowed to stand at about 10° C. for 1 hr. The azo product is precipitated by drowning in water, collected by filtration, and dried in air. The azo compounds are purified by recrystallization from methanol or ethanol. The axo compounds of Examples 2, 3, 4 and 11 produce bright red shades on polyester fibers and the azo compounds of Examples 5 through 10 produce bright rubine shades.

The azo compounds set forth in Tables I and II are synthesized by the procedures described hereinabove and conform, respectively, to the general formulas

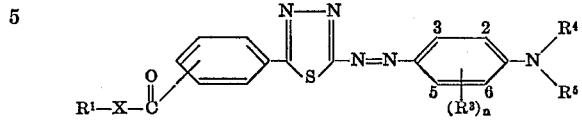

and

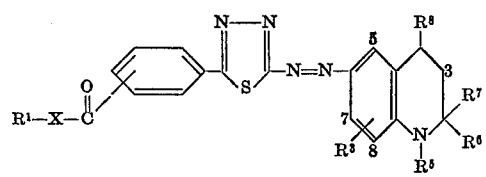

The azo compounds of Table I produce red to bluish-red shades on polyester fibers whereas the azo compounds of Table II produce bluish-red shades.

TABLE I

| Example number | $R^1$—X— | $(R^3)n$ | $R^4$ | $R^5$ |
|---|---|---|---|---|
| 12 | m-OCH₃ | 3-CH₃ | —C₂H₅ | —CH₂CH₂OOCCH₃ |
| 13 | o-OCH₃ | 3-CH₃ | —C₂H₅ | —CH₂CH₂OOCCH₃ |
| 14 | p-OCH₂CH₂OH | 3-CH₃ | —C₂H₅ | —CH₂CH₂OOCCH₃ |
| 15 | p-OCH₂CH₂OOCCH₃ | 3-CH₃ | —C₂H₅ | —CH₂CH₂OOCCH₃ |
| 16 | p-OCH₂CH₂OCH₃ | 3-CH₃ | —CH₂CH₂OCH₃ | —CH₂CH₂OOCCH₃ |
| 17 | p-OCH₂C₆H₅ | H | —CH₂CH₂OOCCH₃ | —CH₂CH₂OOCCH₃ |
| 18 | p-OC₆H₁₁ | 3-CH₃ | —CH₂CH₂CN | —CH₂CH₂CN |
| 19 | p-OC₆H₅ | 3-CH₃ | —CH₂CH₂CN | —C₂H₅ |
| 20 | p-OC₆H₅ | 3-CH₃ | —CH₂CH₂NHCOCH₃ | —C₂H₅ |
| 21 | m-OCH(CH₃)C₂H₅ | 3-CH₃ | —CH₂CH₂OCH₃ | —CH₂CH₂OCH₃ |
| 22 | m-NHC₂H₅ | 3-CH₃ | —C₂H₅ | —CH₂CH₂OOCCH₃ |
| 23 | m-NHC₅H₁₁ | 3-CH₃ | —C₂H₅ | —CH₂CH₂OOCCH₃ |
| 24 | m-NHC₆H₅ | 3-CH₃ | —C₂H₅ | —CH₂CH₂OOCCH₃ |
| 25 | m-NHCH₂C₆H₅ | 3-CH₃ | —C₂H₅ | —CH₂CH₂OOCCH₃ |
| 26 | m-N(C₂H₅)₂ | 3-CH₃ | —C₂H₅ | —CH₂CH₂OOCCH₃ |
| 27 | m-NHC₆H₄—p-OCH₃ | 3-CH₃ | —C₂H₅ | —CH₂CH₂OOCCH₃ |
| 28 | m-NH₂ | 3-CH₃ | —C₂H₅ | —CH₂CH₂OOCCH₃ |
| 29 | p-OCH₃ | 2,5-di-CH₃ | H | —CH₂CH₂CN |
| 30 | p-OCH₃ | 5-CH₃CONH—2-CH₃ | H | —CH₂CH₂OOCCH₃ |
| 31 | p-OCH₃ | 5-CH₃CONH—2-CH₃ | H | —CH₂CH₂CONCH₂ |
| 32 | p-OCH₃ | 5-CH₃CONH—2-CH₃ | H | —CH₂C₆H₁₁ |
| 33 | p-OCH₃ | 5-CH₃CONH—2-CH₃ | H | —CH₂C₆H₅ |
| 34 | p-OCH₃ | 5-OCH₃—2-CH₃ | H | —C₂H₅ |
| 35 | p-OCH₃ | 2-OCH₃—5-CH₃ | H | —CH₂CH₂NOOCH₂CH₂CO |
| 36 | p-OCH₃ | 5-CH₃CONH—2-CH₃ | H | —CH₂CH₂CN |
| 37 | p-OCH₃ | 5-CH₃CONH—2-CH₃ | H | —CH₂CH₂OOCC₆H₅ |
| 38 | p-OCH₃ | 5-CH₃CONH—2-CH₃ | H | —CH₂CH₂OCH₃ |
| 39 | p-OCH₃ | 3-CH₃ | —CH₂CH₂CN | —CH₂CH₂OOCCH₃ |
| 40 | p-OCH₃ | H | —CH₂CH₂CN | —CH₂CH₂OOCCH₃ |
| 41 | p-OCH₃ | 3-CH₃ | —CH₂CH₂CN | —CH₂CH₂OOCOC₂H₅ |
| 42 | p-OCH₃ | 3-CH₃ | —C₂H₅ | —CH₂CH₂NHCOCH₃ |
| 43 | p-OCH₃ | 3-CH₃ | —C₂H₅ | —CH₂CH₂CH₂SO₂CH₃ |
| 44 | p-OCH₃ | 3-CH₃ | —C₂H₅ | —CH₂CH₂OOCCH₂C₆H₅ |
| 45 | p-OCH₃ | 3-CH₃ | —C₂H₅ | —CH₂CH₂OOCCH₂OCH₃ |
| 46 | p-OCH₃ | 3-CH₃ | —C₂H₅ | —CH₂CH₂OOCCH₂Cl |
| 47 | p-OCH₃ | 3-NHCOCH₃ | —C₂H₅ | —CH₂CH₂CONH₂ |
| 48 | p-OCH₃ | 3-NHCOCH₃ | —C₂H₅ | —C₆H₅ |
| 49 | p-OCH₃ | 3-NHCOCH₃ | —C₂H₅ | —C₆H₁₁ |
| 50 | p-OCH₃ | 3-NHCOCH₃ | —CH₂CH₂OCH₃ | —CH₂CH₂OOCCH₃ |
| 51 | p-OCH₃ | 3-NHCOCH₃ | —C₂H₅ | —CH₂CH₂OOCCH(CH₃)₂ |
| 52 | p-OCH₃ | 3-NHCOCH₃ | —C₂H₅ | —CH₂CH₂NHSO₂CH₃ |
| 53 | p-OCH₃ | 3-CH₃ | —CH₂CH₂C₆H₅ | —CH₂CH₂Cl |
| 54 | p-OCH₃ | 3-NHCOC₆H₅ | —C₂H₅ | —C₂H₅ |
| 55 | p-OCH₃ | 3-NHCOC₆H₅ | —C₂H₅ | —CH₂CH₂OOCCH₃ |
| 56 | p-OCH₃ | 3-NHCOC₆H₁₁ | —CH₂CH(C₂H₅)(CH₃)3CH₃ | —C₂H₅ |
| 57 | p-OCH₃ | 3-NHSO₂CH₃ | —(CH₂)₃CH₃ | —C₂H₅ |
| 58 | p-OCH₃ | 3-NHCOOC₂H₅ | —C₂H₅ | —C₂H₅ |
| 59 | p-OCH₃ | 3-NHCOCH₂OCH₃ | —CH₂CH₂OOCCH₃ | —CH₂CH₂N(COCH₃)₂ |
| 60 | p-OCH₃ | 3-NHCOCH₂Cl | —C₂H₅ | —(CH₂)₂NCOCH₂CH₂CH₃ |
| 61 | p-OCH₃ | 3-NHCOCH₂OH | —C₂H₅ | —CH₂CH₂OCH₃ |
| 62 | p-OCH₃ | 3-NHCOCH₂OOCCH₃ | —C₂H₅ | —C₂H₅ |
| 63 | p-OCH₃ | 3-NHCOCH₂CH₂OH | —C₂H₅ | —C₂H₅ |
| 64 | p-OCH₃ | 3-NHCONHC₂H₅ | —C₂H₅ | —C₂H₅ |
| 65 | p-OCH₃ | 3-NHCONHC₆H₅ | —C₂H₅ | —C₂H₅ |
| 66 | p-OCH₃ | 3-NHCOCH₂C₆H₅ | —C₂H₅ | —C₂H₅ |
| 67 | p-OCH₃ | 3-NHCOCH₂OC₆H₅ | —C₂H₅ | —C₂H₅ |
| 68 | p-OCH₃ | 3-NHCOCH₂CN | —C₂H₅ | —C₂H₅ |
| 69 | p-OCH₃ | 3-NHCOCH₂SO₂CH₃ | —C₂H₅ | —C₂H₅ |
| 70 | p-OCH₃ | NHCOCH₂SCH₃ | —C₂H₅ | —C₂H₅ |

TABLE II

| Example number | R¹—X— | R³,R⁴,R⁷,R⁹ | R⁵ |
|---|---|---|---|
| 71 | p-OCH₃ | 2,2,4,7-tri-CH₃ | —C₂H₅ |
| 72 | p-OCH₂CH(CH₃)₂ | 2,2,4,7-tri-CH₃ | —C₂H₅ |
| 73 | p-OCH₂CH(CH₃)₂ | 2-CH₃ | —C₂H₅ |
| 74 | o-OC₂H₅ | 2,8-di-CH₃ | —C₂H₅ |
| 75 | o-OCH₂CH₂OH | 7-OCH₃—2-CH₃ | —C₂H₅ |
| 76 | p-CH₂CH₂OH | 2,7-di-CH₃ | —C₂H₅ |
| 77 | p-CH₂CH₂OH | 2-CH(CH₃)₂—7-CH₃ | —C₂H₅ |
| 78 | p-OCH₃ | 2,2,4-tri-CH₃ | —C₂H₅ |
| 79 | p-OCH₃ | 7-NHCOCH₃—2,2,4-CH₃ | —C₂H₅ |
| 80 | p-OCH₃ | 7-NHCOCH₃—2,2,4-CH₃ | —CH₂CH₂OOCC₂H₅ |
| 81 | p-OCH₃ | 7-NHCOCH₃—2,2,4-CH₃ | —CH₂CH₂COOC₂H₅ |
| 82 | p-OCH₃ | 7-NHCOCH₃—2,2,4-CH₃ | —CH₂CH₂OCH₃ |
| 83 | p-OCH₃ | 7-NHCOCH₃—2,2,4-CH₃ | —CH₂CH₂CONH₂ |
| 84 | p-OCH₃ | 7-NHCOCH₃—2,2,4-CH₃ | —(CH₂)₂NCO-o-C₆H₄SO₂ |
| 85 | p-NHC₂H₅ | 2,2,4,7-tetra-CH₃ | —C₂H₅ |
| 86 | p-OCH₃ | 2,2,4,7 tetra-CH₃ | —CH₂CH(C₂H₅)(CH₂)₃CH₃ |
| 87 | p-OCH₃ | 2,7-di-CH₃ | —CH₂CH₂NCO—(CH₂)₃CO |
| 88 | p-OCH₃ | 2,7-di-CH₃ | —CH₂C₆H₅ |
| 89 | p-OCH₃ | 2,2,4,7-tetra-CH₃ | —CH₂CH₂N(CH₃)SO₂C₆H₅ |
| 90 | p-OCH₃ | 2,2,4,7-tetra-CH₃ | —CH₂CH(CH₃)₂ |

The novel azo compounds of our invention can be applied to polyester textile materials according to well known techniques. The composition of the polyester fibers dyed with our novel compounds is also well known. Such dyeing techniques and polyesters are described in detail in many patents such as French Pat. 2,008,404.

The invention has been described in detail with particular reference to certain preferred embodiments thereof, but it will be understood that variations and modifications may be made without departing from the spirit and scope of the invention as described hereinabove.

We claim:

1. A compound having the formula

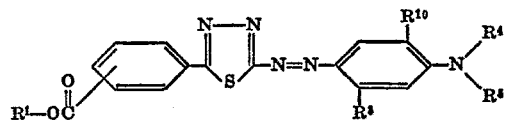

wherein

R¹ is lower alkyl or lower alkyl substituted with hydroxy, lower alkoxy or lower alkanoyloxy;

R³ is hydrogen, lower alkyl, lower alkoxy, lower alkanoylamino, lower alkoxycarbonylamino or benzamido;

R¹⁰ is hydrogen, lower alkoxy or, when R⁴ is hydrogen, lower alkyl;

R⁴ is hydrogen; lower alkyl; lower alkyl substituted with cyano, lower alkanoyloxy, lower alkoxycarbonyl, lower alkoxycarbonyloxy benzoyloxy, lower alkoxy, cyclohexyl, or phenyl; or cyclohexyl; and R⁵ is lower alkyl; lower alkyl substituted with succinimido, glutarimido, phthalimido, lower alkanoyloxy, lower alkoxycarbonyl, lower alkoxycarbonyloxy, or lower alkoxy.

2. A compound according to claim 1 having the formula

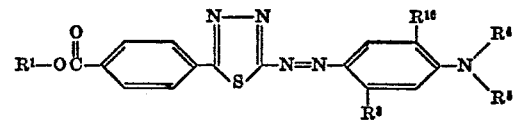

wherein

R¹ is lower alkyl;

R³ is methyl, lower alkanoylamino or lower alkoxycarbonylamino;

R¹⁰ is hydrogen, or, when R⁴ is hydrogen, methyl;

R⁴ is hydrogen, lower alkyl, benzyl, cyclohexyl or the group (—CH₂—)ₙR¹¹ in which n is 2 or 3 and R¹¹ is lower alkanoyloxy, lower alkoxycarbonyl or cyano; and R⁵ is lower alkyl, benzyl or the group (—CH₂—)ₙR¹¹ in which n is 2 or 3 and R¹¹ is lower alkanoyloxy, lower alkoxycarbonyl, succinimido, glutarimido, or phthalimido.

3. A compound according to claim 1 having the formula

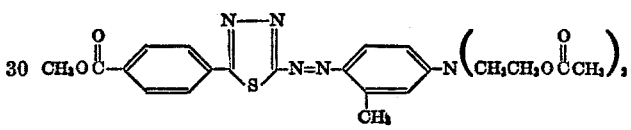

4. A compound according to claim 1 having the formula

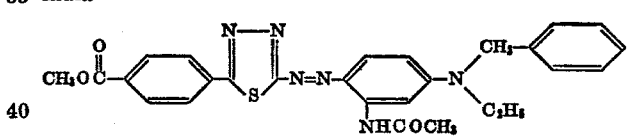

5. A compound according to claim 1 having the formula

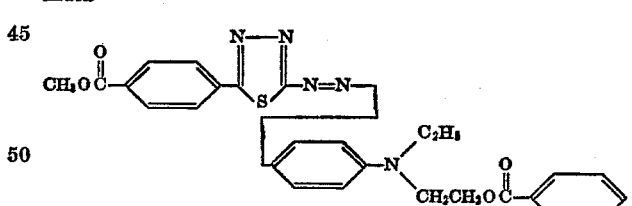

6. A compound according to claim 1 having the formula

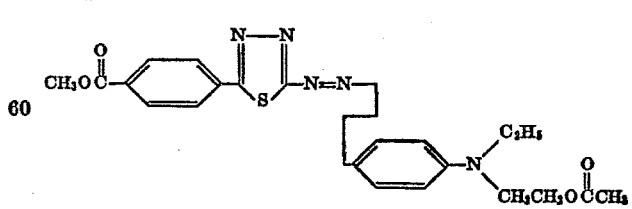

7. A compound according to claim 1 having the formula

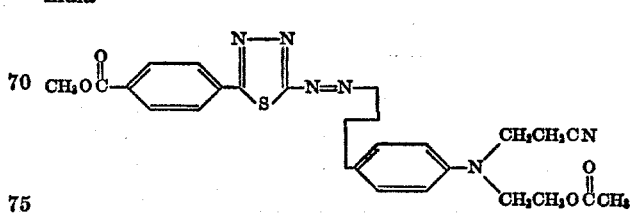

8. A compound according to claim 1 having the formula

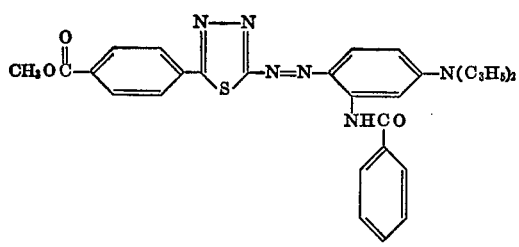

9. A compound according to claim 1 having the formula

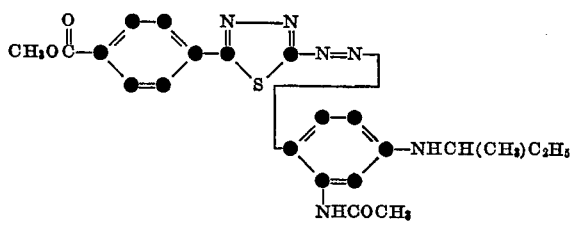

10. A compound having the formula

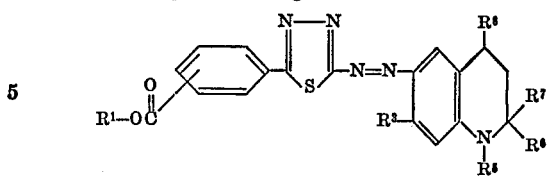

wherein $R^1$ is lower alkyl or lower alkyl substituted with hydroxy, lower alkoxy or lower alkanoyloxy;

$R^3$ is hydrogen, lower alkyl, lower alkoxy, lower alkanoylamino, lower alkoxycarbonylamino, or benzamido;

$R^5$ is lower alkyl; lower alkyl substituted with succinimido, glutarimido, phthalimido, lower alkanoyloxy, lower alkoxycarbonyl, lower alkoxycarbonyloxy, or lower alkoxy;

$R^6$ is lower alkyl or, when $R^7$ and $R^8$ each is methyl, $R^6$ is methyl; and $R^7$ and $R^8$ each is hydrogen or methyl.

References Cited
UNITED STATES PATENTS
3,418,310  12/1968  Dale et al. _____ 260—158

LEWIS GOTTS, Primary Examiner
C. F. WARREN, Assistant Examiner

U.S. Cl. X.R.
260—155, 302 D, 470, 552 SC